United States Patent [19]

Kurihara et al.

[11] Patent Number: 4,714,145
[45] Date of Patent: Dec. 22, 1987

[54] SPEED RESPONSIVE CONTROL FOR OPERATING VEHICLE CLUTCH

[75] Inventors: Kazumasa Kurihara; Kenji Arai, both of Higashimatsuyama, Japan

[73] Assignee: Diesel Kiki Co., Ltd., Tokyo, Japan

[21] Appl. No.: 922,361

[22] Filed: Oct. 23, 1986

[30] Foreign Application Priority Data

Oct. 30, 1985 [JP] Japan ................... 60-243412

[51] Int. Cl.$^4$ .......................................... B60K 41/28
[52] U.S. Cl. ........................... 192/0.052; 192/0.092; 192/0.076
[58] Field of Search .............. 192/0.052, 0.092, 0.04, 192/0.032, 3.58, 3.62, 0.073, 0.075, 0.076, 103 R; 74/866

[56] References Cited

U.S. PATENT DOCUMENTS

| | | | |
|---|---|---|---|
| 4,505,368 | 3/1985 | Ackermann et al. | 192/0.092 |
| 4,509,625 | 4/1985 | Tellert | 192/0.033 |
| 4,518,068 | 5/1985 | Oguma et al. | 192/0.076 X |
| 4,615,425 | 10/1986 | Kobayashi et al. | 192/0.032 |
| 4,618,043 | 10/1986 | Hattori et al. | 192/0.052 |
| 4,632,231 | 12/1986 | Hattori et al. | 192/0.076 |
| 4,645,045 | 2/1987 | Takefuta | 74/866 X |

FOREIGN PATENT DOCUMENTS 60-11756  1/1985  Japan.

Primary Examiner—George H. Krizmanich
Attorney, Agent, or Firm—Pollock, Vande Sande & Priddy

[57] ABSTRACT

A clutch controlling apparatus for automatically carrying out the operation of a clutch device comprises a first output device responsive to the amount of operation of an accelerator pedal for producing a first operation control signal for carrying out the complete engaging operation of the clutch device in relation to the amount of operation of the accelerator pedal, and a second output device responsive to the amount of operation of the accelerator pedal for producing a second operation control signal for operating the clutch device in a semi-engaged state at an amount of semi-engagement related to the amount of operation of the accelerator pedal. Either the first or second operation control signal is selected by a selector in accordance with the amount and speed of operation of the accelerator pedal and the selected operation control signal is applied to the clutch device enabling the operating range of the accelerator pedal to be widened in a control mode according to the second operation control signal.

16 Claims, 11 Drawing Figures

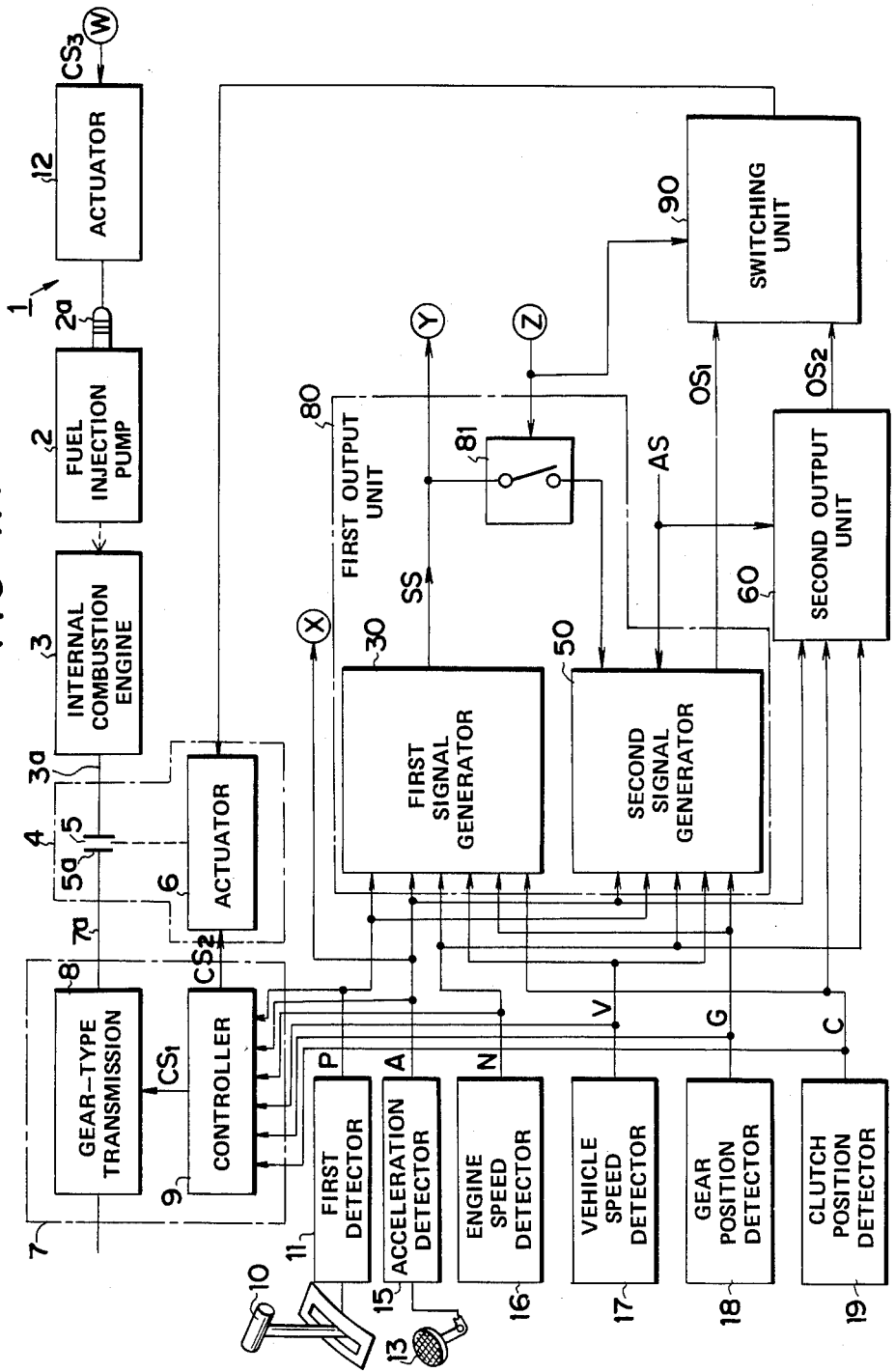

SPEED RESPONSIVE CONTROL FOR OPERATING VEHICLE CLUTCH

BACKGROUND OF THE INVENTION

The present invention relates to an apparatus for controlling a clutch, more particularly to a clutch controlling apparatus which is suitable for controlling the engaging operation of a clutch for a vehicle.

There has been proposed an automatic clutch device for a vehicle in which a dry friction clutch is equipped with a suitable actuator which is controlled by an electronic control apparatus so as to automatically perform the operation of the clutch. This type of automatic clutch device does not differ from the conventional automatic transmission including a torque converter in view of driving operation. However, in such a type of automatic clutch device, since the engaging operation thereof is conducted after the engine speed has increased, when there is an abnormal increase in the engine speed, as when the acceleration pedal is depressed excessively, sudden starting of the vehicle tends to occur. Therefore, there has been the drawback that very low speed control of the vehicle is extremely difficult to perform.

In order to eliminate this drawback, Japanese Patent Application Public Disclosure No. Sho 60-11756 discloses an apparatus in which the throttle is controlled regardless of the amount of depression of the accelerator pedal during the period up to the time that the clutch is fully engaged and the control mode is switched-over between the two types of control modes in response to the amount of depression of the accelerator pedal. In this apparatus, when the amount of depression of the accelerator pedal is less than a predetermined amount of depression, the clutch operation is carried out in a very low speed control mode in which the clutch operation is restricted to a semi-engaging zone thereof and the semi-engaged amount is determined on the basis of the amount of depression of the accelerator pedal. On the other hand, when the amount of depression of the accelerator pedal is not less than the predetermined amount of depression, a regular control mode for the starting operation is performed in which the clutch is fully engaged.

However, in this proposed apparatus, the decision as to whether or not the operation should be carried out in the very low speed control mode is made in accordance with whether the amount of depression of the accelerator pedal is within the predetermined limit and the semi-engaged amount is controlled by the amount of depression of the accelerator pedal within the range below this value. Consequently, the range of operation of the accelerator pedal for the very low speed control operation is restricted within a certain limit and cannot be widened, thus making the very low speed control of the vehicle speed difficult.

Furthermore, in this proposed apparatus, the accelerator pedal must be depressed more than the predetermined value to make the clutch engage. However, there are cases where a small degree of depression of the accelerator pedal is desired even when the engaging operation of the clutch is required at the time of the starting of the vehicle. Accordingly, since the apparatus requires the accelerator to be depressed more than the predetermined amount in order to start the vehicle, it is out of keeping with the conventional driving practice.

SUMMARY OF THE INVENTION

It is an object of the present invention to provide an improved apparatus for controlling a clutch.

It is another object of the present invention to provide a clutch controlling apparatus which is capable, in response to the manner of operation of an accelerator pedal, of switching between a very low speed control mode using the semi-engaging operation of the clutch and a regular engaging control mode for carrying out the complete engaging operation of the clutch, while maintaining a wide operating range of the accelerator pedal for the very low speed control.

According to the present invention, in a clutch controlling apparatus for automatically carrying out the operation of a clutch device operated in response to an electric signal in relation to the amount of operation of an accelerator pedal, the apparatus comprises a first means for producing a first signal relating to the amount of operation of the accelerator pedal, a second means for producing a second signal relating to the operating speed of the accelerator pedal, a first output means responsive to the first signal for producing a first operation control signal for carrying out the complete engaging operation of the clutch device in relation to the amount of operation of the accelerator pedal, a second output means responsive to the first signal for producing a second operation control signal for operating the clutch device in a semi-engaged state at an amount of semi-engagement related to the amount of operation of the accelerator pedal, and a third means responsive to the first and second signals for selectively supplying to the clutch device either the first or second operation control signal in accordance with the amount and speed of operation of the accelerator pedal.

The clutch device is controlled by either the first operation control signal or the second operation control signal selected by the third means. Which operation control signal will be selected by the third means is determined on the basis of two factors: the amount of depression of the accelerator pedal and the speed of depression thereof. Therefore, it becomes possible to widen the operating range of the accelerator pedal in a control mode according to the second operation control signal.

The invention will be better understood and other objects and disadvantages thereof will be more apparent from the following detailed description of preferred embodiments with reference to the accompanying drawings.

BRIEF DESCRIPTION OF THE DRAWINGS

FIGS. 1A and 1B together provide a block diagram of an embodiment of a clutch controlling apparatus according to the present invention;

DESCRIPTION OF THE PREFERRED EMBODIMENTS

Figure 1B:
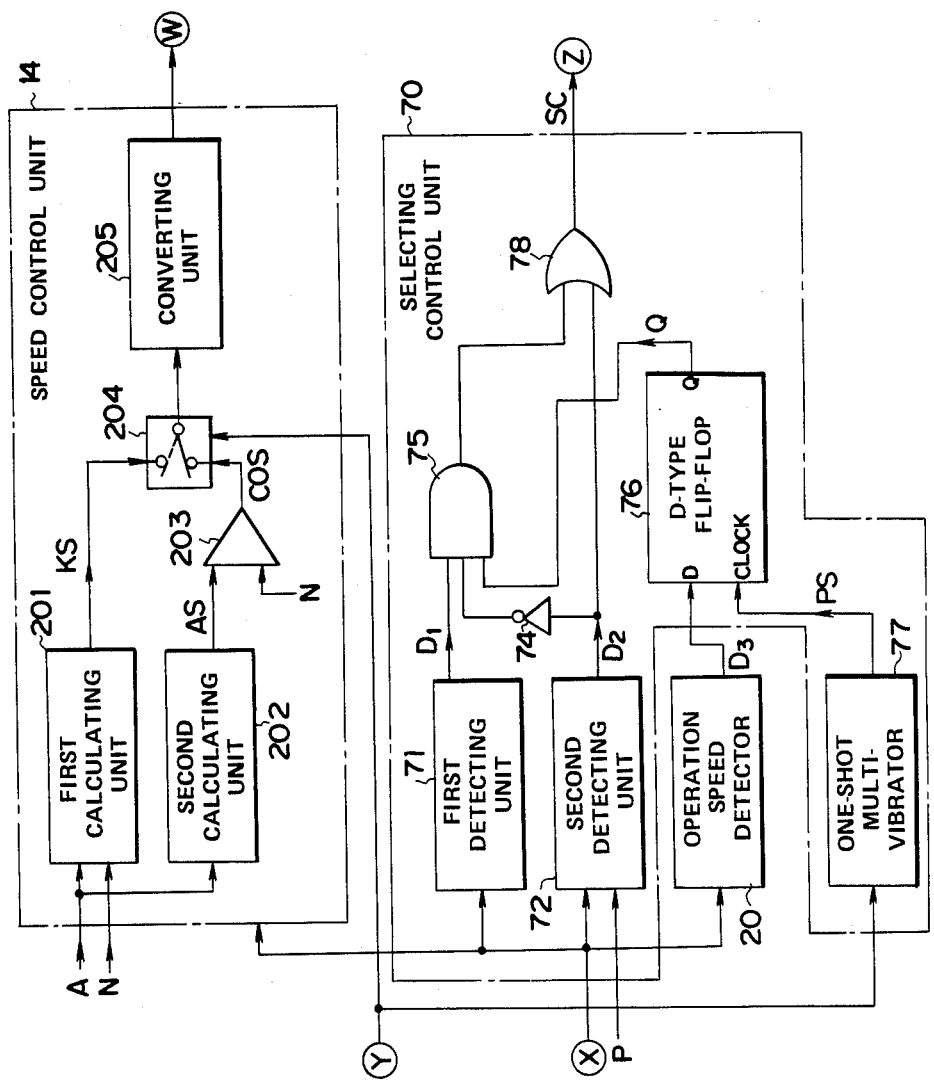

FIGS. 1A and 1B together provide a block diagram showing an embodiment of a clutch control apparatus according to the present invention. A clutch control apparatus 1 is provided for controlling the engaging operation of a clutch device 4 at the time of the starting operation of a vehicle (not shown) powered by an internal combustion engine 3 to which fuel is supplied from a fuel injection pump 2. The clutch device 4 comprises a friction clutch 5 located between an output shaft $3_a$ of the internal combustion engine 3 and an input shaft $7_a$ of a transmission system 7, and an actuator 6 for operating the dry friction clutch 5, which can be operated in response to an electric signal applied to the actuator 6 from the outside.

The transmission system 7 comprises a gear-type transmission 8 set with an actuator (not shown) for carrying out a gear-shifting operation, and a controller 9 which produces first and second control signals $CS_1$ and $CS_2$ for controlling the gear-type transmission 8 and the actuator 6 coupled with the clutch device 4, respectively. The transmission system 7 receives a position signal P from a first detector 11. The position signal P produced by the first detector 11 shows the operating position of a selector 10 at each instant. Furthermore, the transmission system 7 is input with an acceleration signal A showing the amount of operation of an accelerator pedal 13, an engine speed signal N showing the engine speed of the internal combustion engine 3 at each instant, a vehicle speed signal V showing the vehicle speed at each instant, a gear position signal G showing the actual gear position of the gear-type transmission 8 at each instant, and a clutch signal C showing the position of the clutch disc $5_a$ of the dry friction clutch 5. These signals are produced by an acceleration detector 15 connected to the accelerator pedal 13, an engine speed detector 16, a vehicle speed detector 17, a gear position detector 18 and a clutch position detector 19, respectively. The controller 9 outputs the first and second control signals $CS_1$ and $CS_2$ necessary for changing the gear of the gear-type transmission 8 in response to the above input signals. This type of transmission system is widely known so that a detailed description will be omitted. In this embodiment, an arrangement is shown in which the transmission system 7 operates in response to the position signal P. However, the invention is not limited to this embodiment and the transmission system 7 may take a different form as long as it operates in response to at least the operation of the selector 10.

An actuator 12 is connected to a rack $2_a$ for regulating the amount of fuel supplied from the fuel injection pump 2, and there is provided a speed control unit 14 in order to regulate the position of the rack $2_a$ by the use of the actuator 12 in accordance with the amount of depression of the accelerator pedal 13 and the engine speed.

The speed control unit 14 is provided with a first calculating unit 201 which produces a target position signal KS indicating the target rack position in accordance with the maximum-minimum speed governor characteristic in response to the acceleration signal A and the engine speed signal N, and a second calculating unit 202 which produces a target speed signal AS indicating the target engine speed according to the all-speed governor characteristic in response to the acceleration signal A. The target speed signal AS is input to one input terminal of a comparator 203 having another input terminal to which the engine speed signal N is applied, and the comparator 203 outputs an output signal COS representing the difference between the target speed and the actual engine speed.

The output signal COS and the target position signal KS are input to a selecting switch 204 which operates in response to a start command signal SS produced from a first signal generator 30, a description of which will be given later. The selecting switch 204 is operated so as to select the output signal COS in the case where a start command signal SS is produced, and to select the target position signal KS in any other case. The output from the selecting switch 204 is input to a converting unit 205 to convert it into a signal for driving the actuator 12, and a third control signal $CS_3$ for driving the actuator 12 is produced from the converting unit 205.

The clutch control apparatus 1 comprises a first output unit 80 including the first signal generator 30 which discriminates whether or not the vehicle (not shown) powered by the internal combustion engine 3 has assumed a condition where preparation for the starting of the vehicle has been completed and outputs the start command signal SS in the case where a condition in which preparation for the starting of a vehicle is confirmed, a second signal generator 50 which is responsive to the start command signal SS supplied through a switch 81 and produces a first operation control signal $OS_1$ for controlling the actuator 6 in such a way that the dry friction clutch 5 is engaged by a semi-engaging operation corresponding to the position of the selector 10 at that time for starting the vehicle. The clutch control apparatus 1 further comprises a second output unit 60 which is responsive to the acceleration signal A and produces a second operation control signal $OS_2$ for controlling the actuator 6 so as to obtain an amount of semi-engaging operation corresponding to the amount of depression of the accelerator pedal 13 in order to perform the very low speed control operation in accordance with the amount of operation of the accelerator pedal 13.

The first signal generator 30 is responsive to the forementioned signals, P, A, N, V, G and C and discriminates whether the vehicle has assumed a condition in which preparation for starting the vehicle has been completed in accordance with predetermined discrimination criteria. If it is discriminated that the preparation for starting the vehicle has been completed, the start command signal SS is output from the first signal generator 30. In this embodiment, the discrimination criteria in the first signal generator 30 are as follows:

(a) whether or not the accelerator pedal 13 is depressed (discriminated from the acceleration signal A).

(b) whether the internal combustion engine 3 is rotating at a speed greater than the idling rotational speed (discriminated from the engine speed signal N).

(c) whether the clutch is disengaged (discriminated from the clutch signal C).

(d) whether the gear position shown by the selector 10 coincides with the actual gear position (discriminated from the position signal P and the gear position signal G).

(e) whether the actual gear position is in a predetermined low gear position (reverse, first or second gear position) (discriminated from the gear position signal G).

(f) whether the vehicle speed is below a speed necessary for the semi-engaging operation of the clutch at the time of the starting of the vehicle in that gear position (discriminated from the gear position signal G and the vehicle speed signal V).

The start command signal SS is output only when the result of every discrimination from (a) to (f) mentioned above is YES. Furthermore, the discrimination criteria in (a) through (f) are just an example, and it is obvious that other criteria suitably corresponding to different types of conditions can be set instead of or in addition to the criteria mentioned.

The switch 81 is controlled so as to open/close by a selecting control signal SC produced from a selecting control unit 70, and the switch 81 is closed when the selecting control signal SC is at a high level to apply the start command signal SS to the second signal generator 50.

The first and second operation control signals $OS_1$ and $OS_2$ are applied to a switching unit 90 for selecting one of the signals applied and supplying it to the actuator 6. In order that either the first operation control signal $OS_1$ or the second operation control signal $OS_2$ is selected by the switching unit 90 in accordance with the amount and speed of operation of the accelerator pedal 13, the selecting control signal SC from the selecting control unit 70 is applied as a switching control signal to the switching unit 90.

The selecting control unit 70 is responsive to the acceleration signal A and an operation speed signal $D_3$ produced from an operation speed detector 20 which detects the operation speed of the accelerator pedal 13 in response to the acceleration signal A and discriminates whether or not the operation speed Y of the accelerator pedal 13 has reached a predetermined value $Y_1$, and determines which operation control signal should be selected in the switching unit 90. The result of the determination of the selecting control unit 70 is produced as the selecting control signal SC. The description of the selecting control unit 70 will be given hereinafter. The selecting control unit 70 has first and second detecting units 71 and 72 which are responsive to the acceleration signal A. A discrimination is made in the first detecting unit 71 as to whether the amount X of the operation of the accelerator pedal 13 is equal to or greater than a predetermined value $X_1$. If the result of the discrimination is $X \geq X_1$, the level of a first detection signal $D_1$ output from the first detecting unit 71 becomes high. Further, a discrimination is made in the second detecting unit 72 as to whether the amount X of the operation is equal to or greater than a predetermined value $X_2 (>X_1)$ If the result of the discrimination is $X > X_2$, the level of a second detection signal $D_2$ output from the second detecting unit 72 becomes high. The second detecting unit 72 is responsive to the position signal P and the value $X_2$ is determined depending upon the selected operating position of the selector 10.

The operation speed signal $D_3$, the level of which becomes high when $Y > Y_1$, is input to the input terminal D of a D-type flip flop 76 whose clock input terminal CLOCK receives an output pulse PS from a one-shot multi-vibrator 77. The one-shot multi-vibrator 77 is triggered in response to the generation of the start command signal SS and produces an output pulse PS with a predetermined pulse width. The level condition of the operation speed signal $D_3$ at the time an output pulse PS is generated is latched by the D-type flip flop 76 and a signal having the same level as the latched level condition is output as a signal Q from the output terminal Q thereof.

The first detection signal $D_1$, an inverted second detection signal $\overline{D}_2$ obtained by inverting the second detection signal $\overline{D}_2$ by the inverter 74 and the signal Q are input into an AND-gate 75. Consequently, the output level of the AND-gate 75 becomes high only when $X_1 \leq X < X_2$ and $Y \geq Y_1$ at the beginning of the starting of the vehicle. The output from AND-gate 75 is input together with the second detection signal $D_2$ to an OR-gate 78. The output from the OR-gate 78 is obtained as the selecting control signal SC and is applied to the switch 81 and the switching unit 90.

That is, in the case where the acceleration pedal 13 is operated slowly within a range wherein the operation speed Y of the accelerator pedal 13 does not exceed $Y_1$ at the initial stage of the starting of the vehicle, the level of the selecting control signal SC is low within the range $X_1 \leq X < X_2$, so that the switching unit 90 operates so as to select the second operation control signal $OS_2$ and the switch 81 is opened. When X becomes equal to or greater than $X_2$, the level of the selecting control signal SC becomes high, so that the switching unit 90 operates so as to select the first operation control signal $OS_1$ and the switch 81 is closed. This is due to the fact that the D-type flip flop 76 will not be put in a set condition in this case. On the other hand, when the operation speed Y of the accelerator pedal 13 becomes equal to or greater than $Y_1$ within the range $X_1 \leq X < X_2$, the D-type flip flop 76 is set and the level of the signal Q becomes high, so that the level of the selecting control signal SC is high. Therefore, the switching unit 90 is operated so as to select the first operation control signal $OS_1$ and the switch 81 is closed. In this case, the high level state thereof is maintained even when X becomes equal to or greater than $X_2$.

The constitution of the second signal generator 50 will be described with reference to FIG. 2 in the following.

The start command signal SS is applied to first to fourth signal generating unit 32 to 35, and first to fourth target signals $TS_1$ to $TS_4$ are produced from these units 32 to 35 in response to the application of the start command signal SS. The first to fourth target signals $TS_1$ to $TS_4$ show the target slip rates of the clutch at each instant after the start command signal SS is produced.

FIG. 3A to 3D show each of the characteristics of the first through fourth target signals $TS_1$ through $TS_4$ In this embodiment, the first target signal $TS_1$ indicates the target slip characteristic in the case where the drive (D) position is selected by the selector 10 while the second target signal $TS_2$ indicates the target slip rate characteristic when the second (2nd) position is selected by the selector 10. Further, the third target signal $TS_3$ indicates the target slip rate characteristic when the first (1st) position is selected by the selector 10, and the fourth target signal $TS_4$ indicates the target slip rate characteristic when the reverse (R) position is selected by the selector 10.

Moreover, the starting gear position for the first position is the first speed gear position; the starting gear position for the second position is the second speed gear position; the starting gear position for the drive position is the second speed gear position; and the starting gear position for the reverse position is the reverse gear position. However, since the engaging characteristic of the clutch is different for each position of the selector 10, even when in the same starting gear position, starting of the vehicle suited to each position of the selector 10 can be carried out.

The first to fourth target signals $TS_1$ to $TS_4$ are input to a selecting unit 36 which operates in response to the position signal P. One of the signals corresponding to the operating position of the selector 10 indicated by the position signal P is selected as a target signal $TS_0$ by the selecting unit 36 and the target signal $TS_0$ is input to a correcting unit 37.

The correcting unit 37 is for correcting the target signal $TS_0$ selected as aforementioned in correspondence to the amount of depression of the accelerator pedal 13 at each instant. The correcting unit 37 is responsive to the acceleration signal A and corrects the characteristics as shown in the dotted lines in FIGS. 3A through 3D. That is, the characteristic curves shown by the solid lines in FIGS. 3A to 3D represent the characteristics when the amount of depression of the accelerator pedal 13 is at the least amount of depression for putting the vehicle into a condition in which its starting operation is controlled. When the amount of depression of the accelerator pedal 13 becomes any greater, the inclination of each characteristic is made much greater correspondingly, and the individual characteristics are corrected so that a much faster starting of the vehicle is possible corresponding to the amount of depression of the accelerator pedal 13.

The target signal $TS_0$ corrected by the correcting unit 37 is input to a first comparing unit 38 as a target slip rate signal K. The first comparing unit 38 receives an actual slip rate signal M showing the actual slip rate of the dry friction clutch 5 from a first calculating unit 39 in which the actual slip rate of the clutch 5 is calculated on the basis of the gear position signal G, the vehicle speed signal V and the engine speed signal N. A signal indicating the difference between the actual slip rate and the target slip rate is calculated in the first comparing unit 38 on the basis of both signals K and M, and output as a difference signal D from the first comparing unit 38.

When the actual slip rate is greater than the target slip rate, the difference signal D assumes a value with a positive sign whereas when the actual slip rate is less than the target slip rate, the difference signal D becomes a value having a negative sign. In order to determine the operating speed of the clutch device 4, the difference signal D is applied to a second calculating unit 40, in which the operating speed of the clutch device 4 corresponding to the value of the difference signal D is calculated. In this case, when the difference indicated by the difference signal D is a negative value, the operating speed of the clutch device 4 is set to zero; that is, it is maintained at that operating position. A signal indicating the result of the calculation in the second calculating unit 40 is output as an operating speed signal DR, which is input to a pulse generating unit 41.

The pulse generating unit 41 outputs a driving pulse signal DP whose duty ratio is determined by the operating speed signal DR. The duty ratio of the driving pulse signal DP approaches 1 as the operating speed indicated by the operating speed signal DR increases, while on the other hand, the duty ratio becomes closer to zero as the speed of the operation slows down. This driving pulse signal DP is derived through a switch 42 as the first operation signal $OS_1$ and applied to the actuator 6 through the switching unit 90.

The actuator 6 is of a widely known construction, having a hydraulic cylinder for operating the dry friction clutch 5. The actuator 6 has a valve for decreasing the pressure of the operating fluid inside the hydraulic cylinder and the valve is driven by the driving pulse signal DP or the first operation control signal $OS_1$. The hydraulic cylinder is operated in such a way that the dry friction clutch 5 is engaged at a speed corresponding to the average degree of the opening of the valve. Therefore, the speed of the engaging operation of the clutch device 4 can be regulated by controlling the duty ratio of the driving pulse signal DP and the clutch device 4 can be maintained at a specific slip condition thereby.

There is provided a second comparing unit 43 for controlling the ON/OFF condition of the switch 42 in order to stop the engaging operation of the clutch device 4 when the engine speed becomes lower than the predetermined target value calculated in the speed control unit 14 during the engaging operation of the clutch device 4 whereby the internal combustion engine 3 is prevented from stalling. The second comparing unit 43 receives the engine speed signal N and a target speed signal AS, and it is discriminated on the basis of the signals N and AS whether the actual rotational speed $N_a$ has decreased by more than a predetermined amount from a target rotational speed $N_t$. When the value of $N_t - N_a$ is greater than a predetermined value, the switch 42 is opened by a switch controlling output SW to terminate the engaging operation of the clutch device 4.

With this constitution, when it is detected in the first signal generator 30 that the preparation for the starting of the vehicle has been completed and the start command signal SS is input through the switch 81 to the second signal generator 50, the first to fourth target signals $TS_1$ to $TS_4$ are output from the first through fourth signal generating units 32 through 35. Since one of these signals $TS_1$ to $TS_4$ is selected in the selecting unit 36 in accordance with the contents of the position signal P, a target signal representing a pattern corresponding to the operating position of the selector 10 at that time is selected out of the four clutch engaging operation patterns shown in FIGS. 3A through 3D. As can be understood from FIG. 3, the individual patterns are set so that the clutch engaging period is long when the operating position of the selector 10 is in a low position such as first or reverse position while the clutch engaging period is short when the operating position of the selector 10 is in the second or drive position. As a result, it is possible to obtain a suitable semi-engaging operation of the clutch 4 for the position selected by the selector 10. In the correcting unit 37, a correction is made to the target signal $TS_0$ from the selecting unit 36 in accordance with the amount of depression of the accelerator pedal 13, whereby the target slip signal K indicating the final target slip rate is obtained.

Thus, the control of the slip rate of the clutch device 4 is carried out in the closed-loop control mode by the use of the actual slip signal M and the target slip signal K showing the pattern for the clutch engaging operation corresponding to the operating position of the selector 10.

As a result, the engaging operation of the clutch device 4 for starting the vehicle in this case is carried out in accordance with the pattern corresponding to the operating position of the selector 10 whereby it is possible to carry out the operation for starting the vehicle which reflects the intentions of the operator. Consequently, when the operator puts the selector 10 in the drive or second position for starting the vehicle on a steep slope, for example, the clutch engaging operation can be performed at a comparatively high speed and the vehicle can be started on a slope smoothly. Meanwhile, when the operator requires a slow starting of the vehicle in the first speed position for starting the vehicle, for example, on a road covered in snow, the engaging speed of the clutch likewise becomes slow so that a safe starting of the vehicle can be expected. Furthermore, when the rotational speed of the internal combustion engine 3 has become less than the target value during the engaging operation of the clutch 5, a switch 42 is controlled so as to be opened by the second comparing unit 43, the engaging operation of the clutch 5 is suspended, and the occurrence of engine stalling during the engaging operation of the clutch 5 is effectively prevented.

Furthermore, the characteristics shown in FIG. 3 are only examples and the characteristics of the device according to the present invention are by no means restricted to those shown in FIG. 3.

Figure 2:
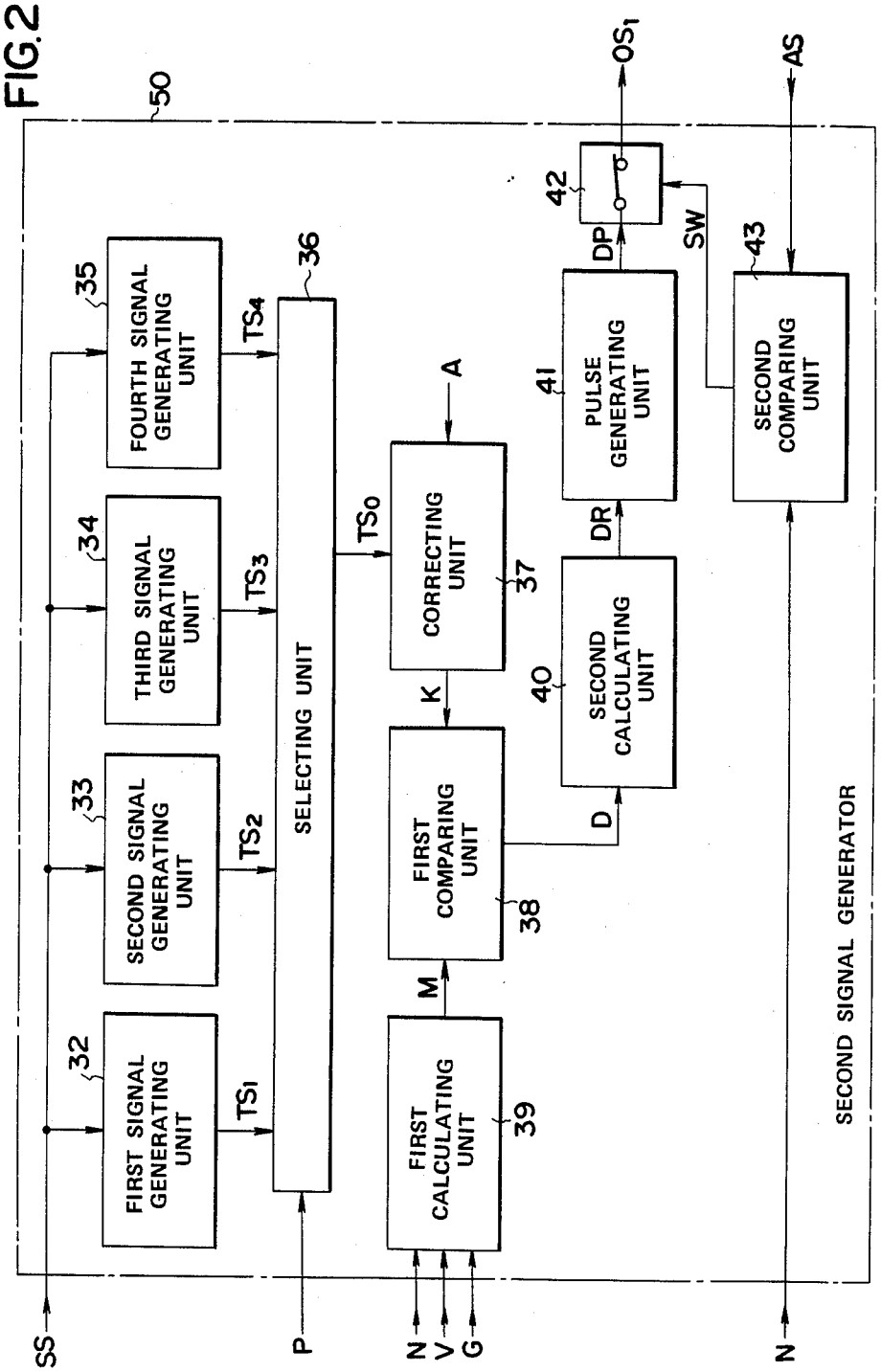
FIG. 2 is a detailed block diagram of a second signal generator shown in FIG. 1A.
Figure 3A:
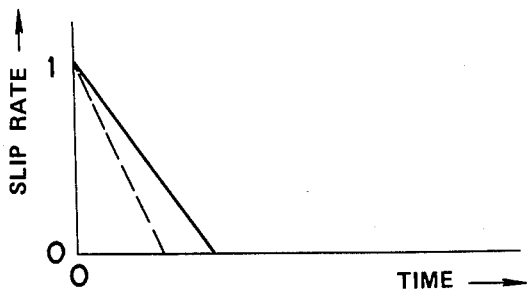
FIGS. 3A to 3D are characteristic diagrams showing the individual characteristics of the mode of the clutch engaging operation executed by a first output unit shown in FIG. 1A.
Figure 3B:
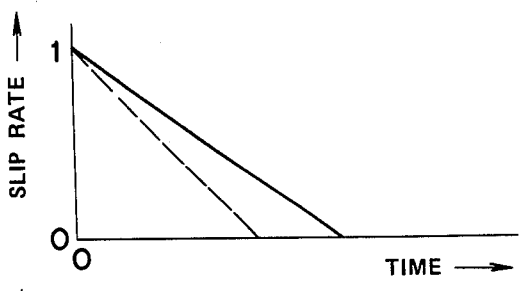
Figure 3C:
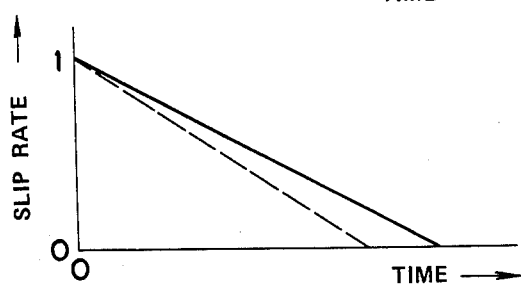
Figure 3D:
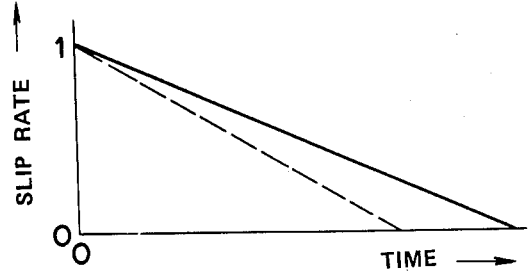

Moreover, the construction shown in FIG. 2 is such that the engaging operation of the clutch at the time of the starting of the vehicle is carried out as a result of the control of the slip rate being carried out. However, it is also possible to use an arrangement in which the engaging operation of the clutch at the time of the starting of the vehicle is carried out by controlling the position of the clutch disc in accordance with a predetermined control pattern with the passage of time after when the vehicle starting operation initially starts.

The second output unit 60 is responsive to the acceleration signal A and produces the second operation control signal $OS_2$ for driving the actuator 6 in such a way that a degree of semi-engagement corresponding to the amount of operation of the accelerator pedal 13 can be obtained in the clutch device 4. The second operation control signal $OS_2$ is then supplied to the actuator 6 through the switching unit 90.

Figure 4:
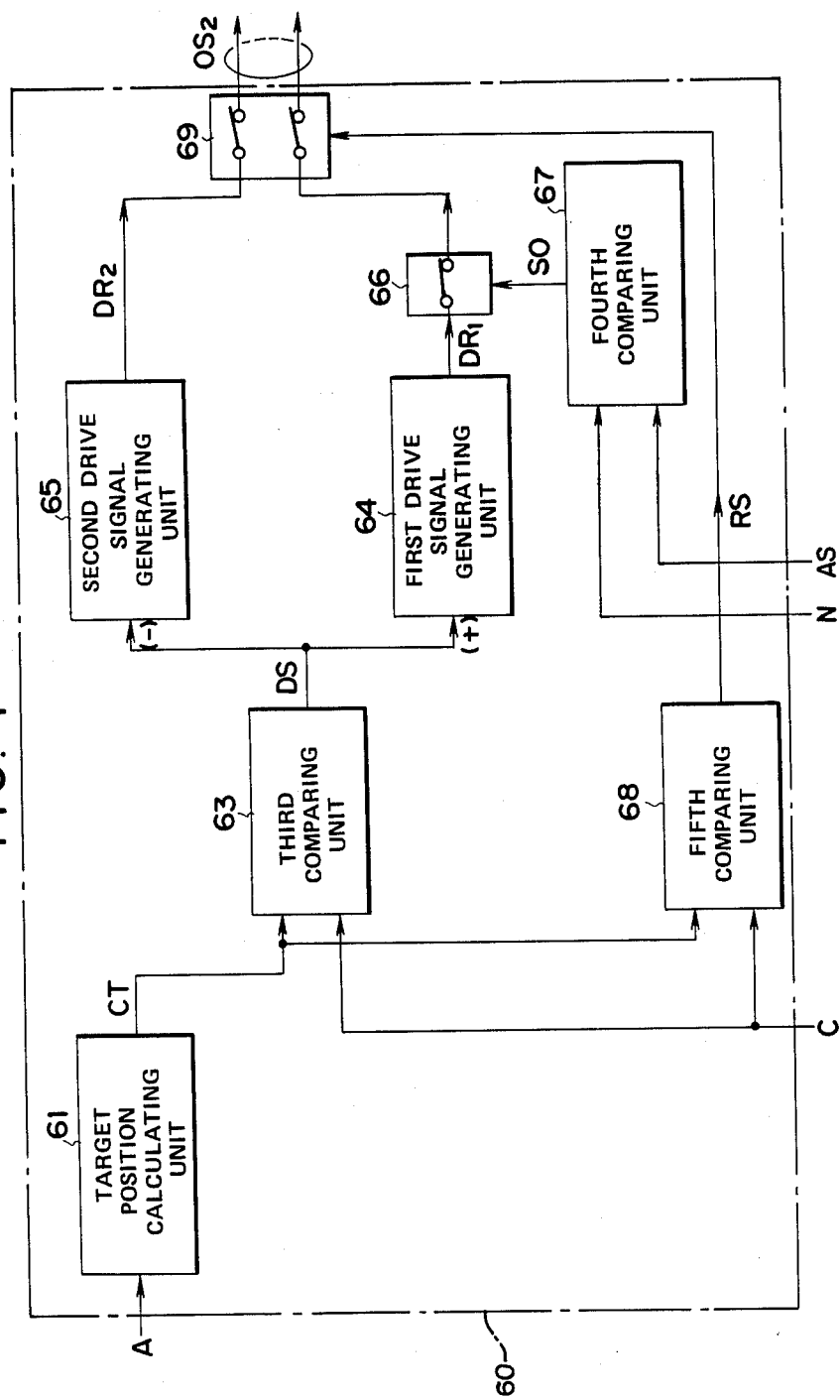
FIG. 4 is a detailed block diagram of a second output unit shown in FIG. 1A.

FIG. 4 shows a detailed block diagram of the second output unit 60. The second output unit 60 has a target position calculating unit 61 responsive to the acceleration signal A for producing a target signal CT indicating the target position of the clutch operating position of the clutch 5 which is necessary for obtaining the degree of semi-engagement corresponding to the amount of depression of the accelerator pedal 13. The target signal CT and the clutch signal C are input to a third comparing unit 63, which produces a difference signal DS corresponding to the difference between the target operating position and the actual operating position of the clutch 4. The sign of the difference signal DS becomes positive when the actual operating position is less than the target position, while the sign becomes negative when the actual operating position is greater than the target position. In response to the fact that the sign of the difference signal DS is positive, a first drive signal generating unit 64 generates an engaging driving signal $DR_1$ for driving the actuator 6 so that it is operated in the direction in which the friction clutch 5 is engaged. On the other hand, in response to the sign of the difference signal DS being negative, a second driving signal generating unit 65 outputs a disengaging driving signal $DR_2$ for driving the actuator 6 in such a way that it is operated in the direction in which the friction clutch 5 is disengaged.

There is provided a fourth comparing unit 67 for controlling the ON/OFF condition of the switch 66 in order to stop the engaging operation of the clutch 5 when the engine speed becomes lower than the predetermined target value calculated in the speed control unit 14 during the engaging operation of the clutch 4 whereby the internal combustion engine is prevented from stalling. The fourth comparing unit 67 receives the engine speed signal N and the target speed signal AS, and it is discriminated on the basis of the signals N and AS whether the actual rotational engine speed $N_a$ has decreased by more than a predetermined amount from a target rotational engine speed $N_t$. When the value of $N_t$-$N_a$ is greater than a predetermined value, the switch 66 is opened by a switch controlling output SO to terminate the engaging operation of the clutch device 4. The engaging driving signal $DR_1$ and the disengaging driving signal $DR_2$ are derived through a switch 69 as the second operation control signal $OS_2$ and input to the switching unit 90 wherefrom it is supplied to the actuator 6. The engaging driving signal $DR_1$ corresponds to the driving pulse signal DP in the first operation control signal $CS_1$ and there is no corresponding signal to the disengaging driving signal $DR_2$ in the first operation control signal $CS_1$.

A fifth comparator 68 is provided for detecting whether the actual operating position of the clutch 4 substantially coincides with the target operating position. The fifth comparator 68 is responsive to the target signal CT and the clutch signal C and produces a coincident signal RS whose level becomes high when the actual operating position is substantially equal to the target operating position. The switch 69 is responsive to the coincident signal RS and is put into an open state only when the level of the coincident signal RS has become high, whereby the actuator 6 is not driven when the target operating position is substantially equal to the actual operating position.

The operation of the clutch controlling apparatus 1 will be described in the following. When the operator depresses the accelerator pedal 13 with the selector 10 in a position other than the neutral position, the condition of the operation of the accelerator pedal 13 is discriminated by the selecting control unit 70 and it is determined whether the operation should be carried out in the normal engaging operation mode carried out by the output from the first output unit 80 or in the semi-engaging operation mode for the very slow speed control carried out by the output from the second output unit 60. That is, the clutch device 4 is controlled in the semi-engaging operation mode when the amount X of depression of the accelerator pedal 13 is $X_1 \leq X < X_2$ and the operation speed Y is lower than the predetermined value $Y_1$, while the clutch device 4 is controlled in the engaging operation mode when $X \geq X_2$ or even when $X_1 \leq X < X_2$ as long as $Y \geq Y_1$.

When it has been discriminated on the basis of the depressed condition of the accelerator pedal 13 that the clutch device 4 should be controlled in a normal engaging operation mode, the switch 81 is closed by the selecting control signal SC, and the start command signal SS is applied to the second signal generator 50 to generate the first operation control signal $OS_1$. The first operation control signal $OS_1$ is selected by the switching unit 90 whereby the clutch engaging operation is carried out. On the other hand, when it has been discriminated on the basis of the depressed condition of the accelerator pedal 13 that the clutch device 4 should be controlled in a semi-engaging operation mode, the switch 81 is not closed, so that the start command signal SS is not applied to the second signal generator 50, and the second operation control signal $OS_2$ is selected by the switching unit 90 to operate the clutch device 4 in the semi-engaging operation mode, whereby the very low speed control of the vehicle is carried out.

As already described, the decision as to which operation mode should be selected is not only made on the basis of the amount of operation of the accelerator pedal 13 but also in view of the operation speed thereof. It is therefore possible for the clutch device 4 to be controlled in a normal engaging operation mode even when the amount of operation of the accelerator pedal 13 is below $X_2$ as long as the operation speed thereof is greater than $Y_1$. Accordingly, there is no inconvenience caused from widening the range of operation of the accelerator pedal 13 when in the semi-engaging operation mode as compared with that set in the conventional apparatus. Therefore, a comparatively large operating range of the accelerator pedal 13 is possible for the semi-engaging operation during the semi-engaging operation mode. As a result, this constitution has the advantage of carrying out the very low speed control operation of the vehicle smoothly.

When $X \geq X_2$, the operation according to the semi-engaging operation mode is terminated even if the speed of the depression of the accelerator pedal 13 is low, and a normal engaging operation mode is implemented.

Figure 5:
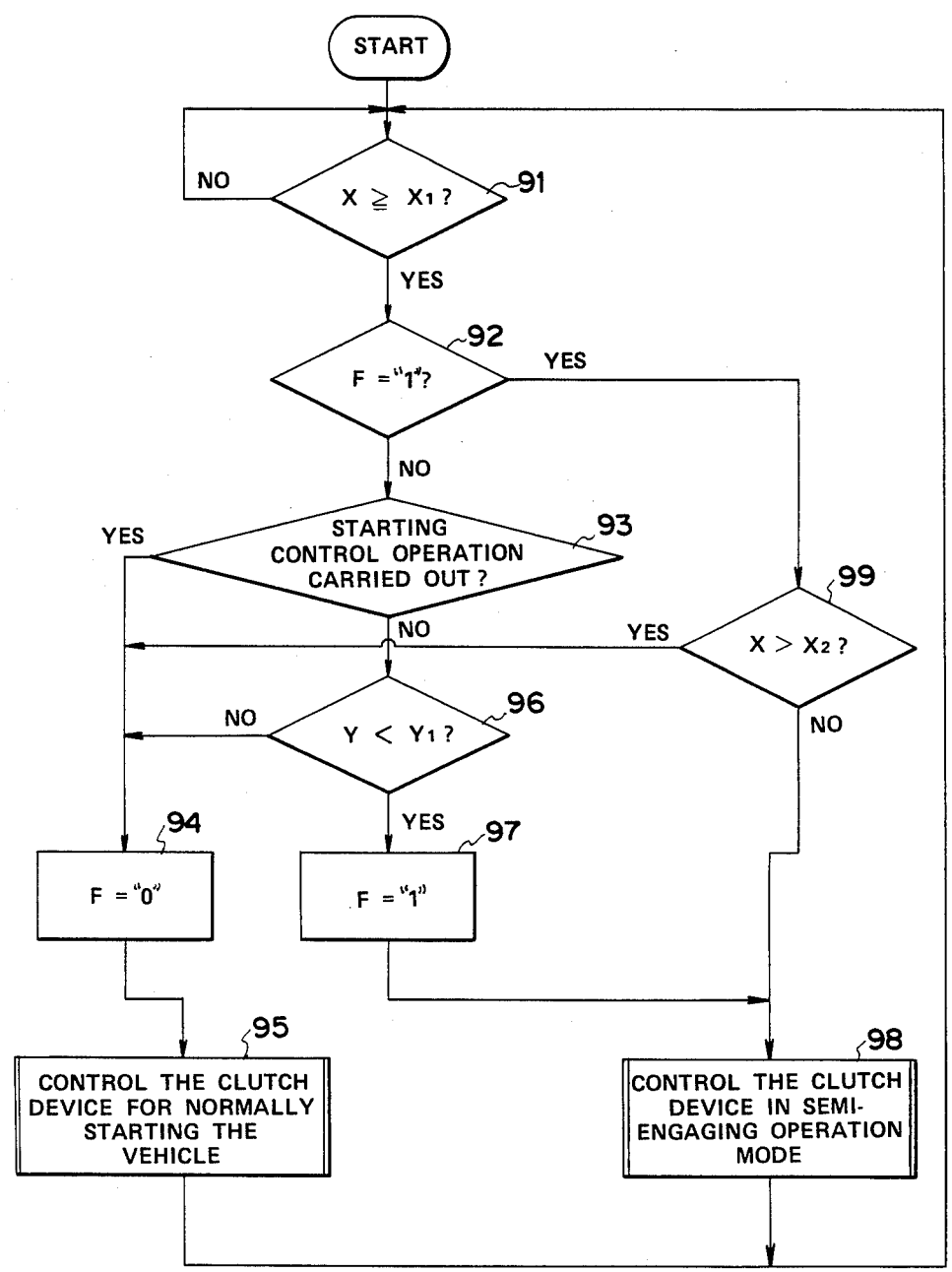
FIG. 5 is a flowchart showing a control program for the case where identical functions to those of a portion of the apparatus shown in FIG. 1 are realized using a microcomputer.

FIG. 5 shows a flowchart of a control program which is executed in a microcomputer for realizing identical functions to those of the first output unit 80, the second output unit 60, the selection control unit 70 and the switching unit 90 in the clutch controlling apparatus 1 shown in FIGS. 1A and 1B by the use of a microcomputer.

After the start of the execution of the program, it is discriminated in step 91 whether $X \geq X_1$, and the step 91 is repeatedly carried out until the result of the discrimination becomes YES. When the result of the discrimination has become YES, the operation moves to step 92, wherein it is discriminated whether flag F, which shows that the clutch engaging operation is being carried out under the semi-engaging operation mode, is set. If F="0", the result of the decision in step 92 becomes NO, and the operation moves to step 93 wherein it is discriminated whether the control operation for starting the vehicle is being carried out. When the control operation for starting the vehicle is being carried out, the result of the discrimination in step 93 becomes YES and the operation moves to step 94 wherein flag F is reset. The operation then moves to step 95 in which the control for engaging the clutch (normal vehicle starting control) is performed to normally start the vehicle. After this, the operation moves back to step 91.

When the discrimination result in step 93 is NO, the operation moves to step 96 wherein the decision is made as to whether the operating speed Y of the accelerator pedal 13 is below $Y_1$. When the result of the discrimination in step 96 is NO, the operation proceeds to step 94. On the other hand, when the result of the discrimination in step 96 is YES, the procedure moves to step 97 wherein flag F is set. The operation then moves further to step 98 in which the clutch 4 is controlled in the semi-engaging operation mode, and the operation reverts back to step 91.

When the flag F is set to "1" in the abovementioned manner, the decision in step 92 in the following program cycle becomes YES, and the procedure moves to step 99 in which the decision is made as to whether $X > X_2$. If $X \leq X_2$, the result of the decision in step 99 becomes NO and step 98 is executed continuously. The result of the decision in step 99 becomes YES when the amount of depression of the accelerator pedal 13 increases and $X > X_2$. Then, the operation moves to step 94 wherein F="0" and then to step 95 wherein the normal vehicle starting control is executed.

Figure 6:
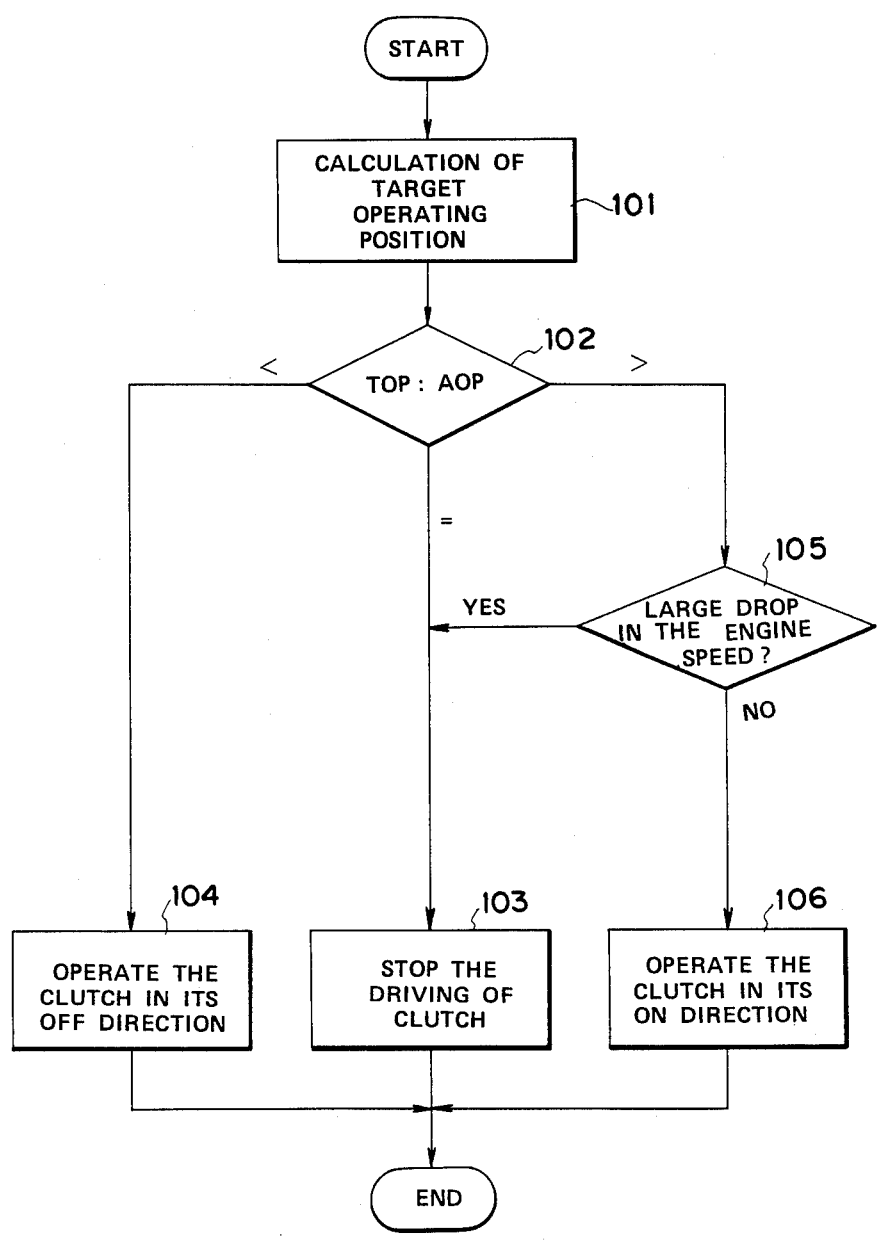
FIG. 6 is a detailed flowchart of a control step for the semi-engaging operation of the clutch according to the flowchart shown in FIG. 5.

FIG. 6 is a detailed flowchart showing the control operation of the clutch in the semi-engaging control mode executed in step 98 shown in FIG. 5. An explanation of FIG. 6 will be given hereinafter. In step 101, the target operating position of the clutch 4 is calculated on the basis of the amount of operation of the accelerator pedal 13. After this, the procedure moves to step 102 wherein the target operating position calculated in step 101 is compared with the actual operating position of the clutch 4. If the actual operating position AOP of the clutch 4 is equal to the target operating position TOP, the procedure moves to step 103 wherein the operation for driving the actuator 6 is stopped and the actual operating position of the clutch 4 is maintained where it is at that time. If the actual operating position AOP of the clutch 4 has exceeded the target operating position TOP in the clutch ON direction, the procedure moves to step 104 in which the actuator 6 is driven so as to bring the actual operating position AOP of the clutch 4 back in the clutch OFF direction by a predetermined amount. On the contrary, if the actual operating position AOP of the clutch 4 is less than the target operating position TOP in the ON direction, the operation moves to step 105 wherein the decision is made as to whether the engine load is causing a large drop in the engine speed. If a large drop in engine speed is being caused, (the result of the decision in step 105 is YES), the operation moves to step 103 in which the engaging operation of the clutch is stopped. On the other hand, if a large drop in engine speed is not being caused, the decision in step 105 is NO, and the procedure moves to step 106 wherein the actuator 6 is driven so as to bring the actual operating position AOP of the clutch 4 in the clutch ON direction by a predetermined amount.

Figure 7:
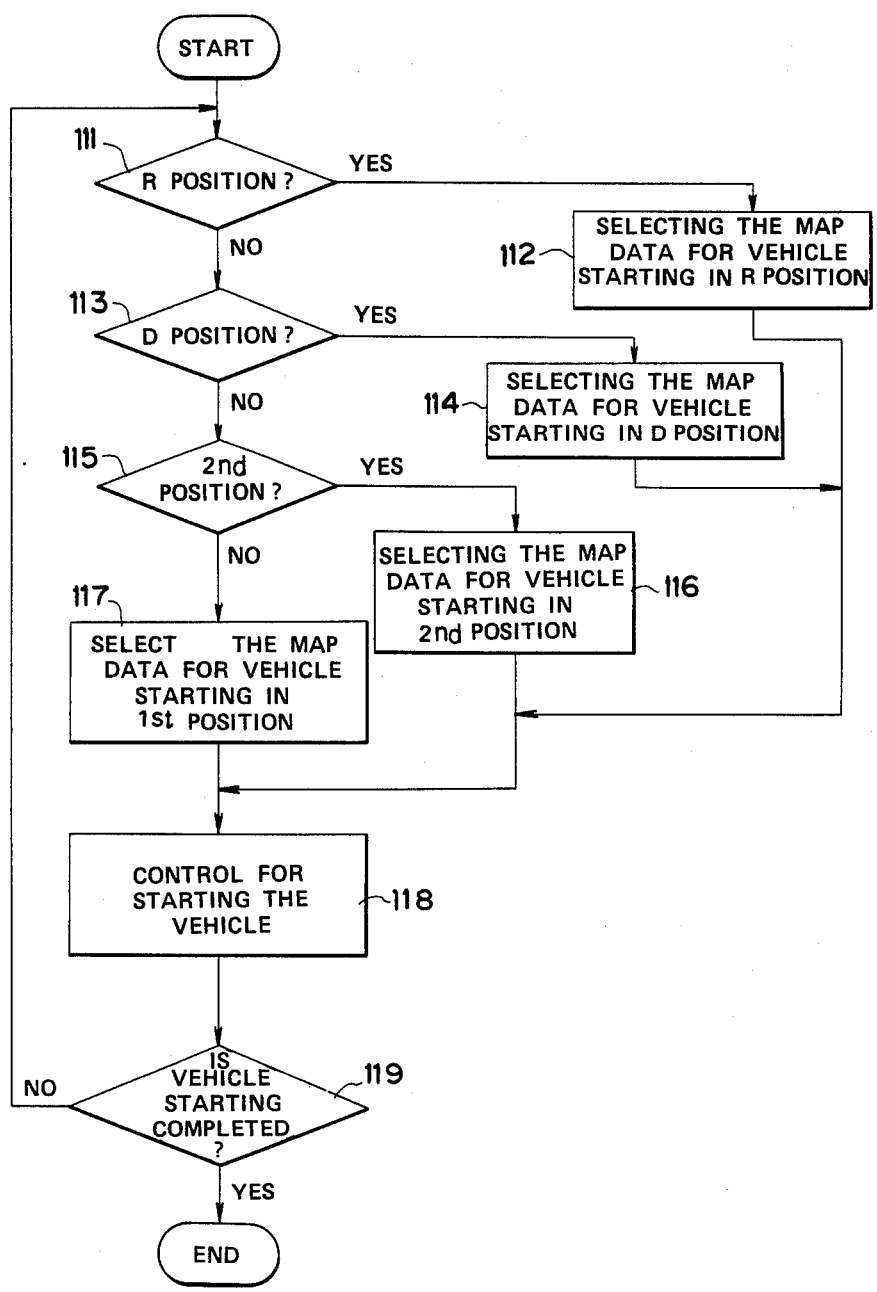
FIG. 7 is a detailed flowchart of a control step for the normal operation according to the flowchart shown in FIG. 5.

A detailed description will be given in the following of the operation of step 95 shown in FIG. 5 with reference to FIG. 7. After the beginning of the control operation for normally starting the vehicle, firstly, the operation moves to step 111, wherein a decision is made as to whether the reverse (R) position is selected by the selector 10. If the reverse (R) position is selected by the selector 10, the operation proceeds to step 112 wherein map data for starting the vehicle in the reverse (R) position is selected. If the decision in step 111 is NO, the operation moves to step 113 in which a decision is made as to whether the drive (D) position is selected by the selector 10. If the determination in step 113 is YES, the procedure moves to step 114 wherein map data for starting the vehicle in the drive (D) position is selected. If the result of the discrimination in step 113 is NO, the operation moves to step 115 wherein it is discriminated whether the position of the selector 10 is in the second (2nd) position. When the result of the discrimination in step 115 is YES, the procedure moves to step 116 wherein map data for starting the vehicle in the second (2nd) position is selected. If the result of the discrimination in step 115 is NO, the first (1st) position is selected by the selector 10, so that the operation moves on to step 117 where map data for starting the vehicle in the first (1st) position is selected.

After necessary map data for starting the vehicle in the position selected by the selector 10 has been selected in the aforementioned manner, the operation proceeds to step 118 wherein a control operation is performed for starting the vehicle with reference to the selected map data for starting the vehicle. That is, an operation for starting the vehicle including the engaging operation of the clutch 4 is carried out. The operation then proceeds to step 119 wherein it is confirmed whether the starting of the vehicle has been terminated. If the starting of the vehicle has not been terminated, the result of step 119 becomes NO, and the operation moves back to step 111 to repeatedly execute the forementioned operation. When it is discriminated in step 119 that the starting of the vehicle has been terminated, the execution of step 95 is terminated.

We claim:

1. A clutch controlling apparatus for automatically carrying out the operation of a clutch device operated in response to an electric signal in relation to the amount of operation of an accelerator pedal; said apparatus comprising:
   a first means for producing a first signal relating to the amount of operation of the accelerator pedal;
   a second means for producing a second signal relating to the operating speed of the accelerator pedal;
   a first output means responsive to the first signal for producing a first operation control signal for carrying out the complete engaging operation of the clutch device in relation to the amount of operation of the accelerator pedal;
   a second output means responsive to the first signal for producing a second operation control signal for operating the clutch device in a semi-engaged state at an amount of semi-engagement related to the amount of operation of the accelerator pedal; and
   a third means responsive to the first and second signals for selectively supplying to the clutch device either the first or second operation control signal in accordance with the amount and speed of operation of the accelerator pedal.

2. An apparatus as claimed in claim 1 wherein said second means is responsive to the first signal and produces as the second signal a signal showing that the operating speed of the accelerator pedal has become more than a prescribed level.

3. An apparatus as claimed in claim 2 wherein said third means has a switching means for selecting either the first or second operation control signal, and selecting control means responsive to the first and second signals for discriminating which signal of the first or second operation control signal should be selected in accordance with the amount and speed of operation of the accelerator pedal and for controlling the switching operation of said switching means in accordance with the result of the discrimination thereof.

4. An apparatus as claimed in claim 1 wherein said first output means has a first signal generating means which discriminates in response to at least the first signal whether or not the prescribed conditions required for performing the fully engaging operation of the clutch device are satisfied and produces a start signal when the prescribed conditions are satisfied, and a second signal generating means for generating as the first operation control signal a signal for engaging the clutch device by gradually reducing a slip rate of the clutch device with the passage of time in response to the application of the start signal.

5. An apparatus as claimed in claim 3 wherein said first output means has a first signal generating means which discriminates in response to at least the first signal whether or not the prescribed conditions required for performing the fully engaging operation of the clutch device are satisfied and produces a start signal when the prescribed conditions are satisfied, a second signal generating means for generating as the first operation control signal a signal for engaging the clutch device by gradually reducing a slip rate of the clutch device with the passage of time when the start signal is applied thereto, and means responsive to an output from said selecting control means for applying the start signal to said second signal generating means when it is discriminated in said selecting control means that the first operating control signal should be selected.

6. An apparatus as claimed in claim 3 wherein said first output means has a first signal generating means which discriminates in response to at least the first signal whether or not the prescribed conditions required for performing the fully engaging operation of the clutch device are satisfied and produces a start signal when the prescribed conditions are satisfied, and a second signal generating means for generating as the first operation signal a signal for engaging the clutch device by reducing a slip rate of the clutch device with the passage of time in response to the application of the start signal.

7. An apparatus as claimed in claim 6 wherein said selecting control means has means for detecting whether or not the amount of operation of the accelerator pedal has reached a prescribed amount, means for detecting whether or not the amount of operation of the accelerator pedal is within an operating range of the accelerator pedal whose upper limit is equal to the prescribed amount, and means responsive to the second signal and the start signal for latching the condition of the second signal at the time of the output of the start signal, whereby it is determined that the first operation control signal should be selected when the amount of operation of the accerator pedal has reached the prescribed amount or when the amount of operation of the accelerator pedal is within the range and the speed of operation of the accelerator pedal at the time of the output of the start signal is more than the prescribed level.

8. An apparatus as claimed in claim 4 wherein said second signal generating means has means for producing a plurality of target slip rate signals in response to the application of the start signal, each of the target slip rate signals being indicative of a target slip rate which decreases with the passage of time in accordance with a different characteristic, means for selecting one of the target slip rate signals in accordance with an operating condition of a device associated with the clutch device, and a first driving means for producing as the first operating control signal a control signal for controlling the engaging operation of the clutch device in accordance with the selected target slip rate signal.

9. An apparatus as claimed in claim 8 wherein said first driving means includes a correcting means for correcting the selected target slip rate signal in response to the first signal.

10. An apparatus as claimed in claim 8 wherein a parameter of the operating condition is a selected operating position of a selector associated with a vehicle transmission coupled with the clutch device.

11. An apparatus as claimed in claim 9 wherein said first driving means has means for producing an actual slip rate signal showing the actual slip rate of the clutch device, means responsive to the selected target slip rate signal and the actual slip rate signal for producing a difference signal corresponding to the difference between the actual slip rate and target slip rate at that time, means responsive to the difference signal for setting an actuating speed for actuating the clutch device, and means for producing as the first operating control signal a driving signal for performing the operation for engaging the clutch device at the actuating speed in response to the output from said means for setting an actuating speed.

12. An apparatus as claimed in claim 11 further comprising means for cutting off the output of the first operating control signal when the amount of load of an internal combustion engine coupled with the clutch device becomes larger than a predetermined load level.

13. An apparatus as claimed in claim 1 wherein said second output means has means responsive to the first signal for producing a target amount signal representing a target amount of operation of the clutch device according to the amount of operation of the accelerator pedal, means for producing an actual amount signal representing an actual amount of operation of the clutch device at each instant, and a second driving means responsive to the target and actual amount signals for producing as the second operating control signal a signal for controlling the clutch device in such a way that the actual amount of operation of the clutch device becomes coincident with the target amount thereof.

14. An apparatus as claimed in claim 13 wherein said second driving means has means responsive to the target and actual amount signals for producing an error signal showing the difference between the target and actual amount signals for producing an error signal showing the difference between the target and actual amount of operation of the clutch device, means responsive to the error signal for producing either an engaging driving signal for engaging the clutch device or a disengaging driving signal for disengaging the clutch device, a coincident detecting means responsive to the target and actual amount signal for detecting whether or not the actual amount of the operation of the clutch device is coincident with the target amount thereof, and means for cutting off the output of the engaging and disengaging driving signals when it is detected that the actual amount of the operation of the clutch device is substantially coincident with the target amount thereof.

15. An apparatus as claimed in claim 7 wherein the prescribed amount is determined by the operating condition of a device coupled with the clutch device.

16. An apparatus as claimed in claim 15 wherein the device coupled with the clutch device is a transmission and the prescribed amount is determined by the gear shift position of the transmission at that time.

* * * * *